United States Patent [19]

Strand

[11] Patent Number: 4,537,670
[45] Date of Patent: Aug. 27, 1985

[54] APPARATUS FOR MAKING A STAMPING MASTER FOR VIDEO DISK REPLICATION

[75] Inventor: David A. Strand, West Bloomfield, Mich.

[73] Assignee: Energy Conversion Devices, Inc., Troy, Mich.

[21] Appl. No.: 603,618

[22] Filed: Apr. 25, 1984

Related U.S. Application Data

[62] Division of Ser. No. 383,176, May 28, 1982, abandoned.

[51] Int. Cl.³ .................. C25D 17/00; B05D 5/06; B32B 3/02
[52] U.S. Cl. ..................... 204/224 R; 427/162; 428/64
[58] Field of Search ............ 428/64; 427/162; 204/5, 204/224 R

[56] References Cited

U.S. PATENT DOCUMENTS

| | | | |
|---|---|---|---|
| 4,091,171 | 5/1978 | Ohta et al. | 427/162 X |
| 4,188,240 | 2/1980 | Yoshio | 204/5 X |
| 4,211,617 | 7/1980 | Hunyar | 204/5 |
| 4,422,904 | 12/1983 | Wilkinson | 204/5 |
| 4,430,401 | 2/1984 | Wilkinson | 204/5 X |

FOREIGN PATENT DOCUMENTS 0064345  4/1982  Japan ................ 204/5

Primary Examiner—Donald R. Valentine
Attorney, Agent, or Firm—Lawrence G. Norris

[57] ABSTRACT

There is disclosed a new and improved apparatus for making a stamping master for video disk replication wherein a film of material which is reversibly convertible between two stable states, one having a high electrical conductivity and the other having a low electrical conductivity, is deposited on a substrate while in one of the states. The material is then imaged with information in coded form by converting selected areas of the film to the other state in a predetermined pattern corresponding to the coded information. The conversion can be accomplished by light, electromagnetic energy or heat.

At this stage, an intermediate subassembly, composed of the imaged film on the substrate, is formed which can be read for accuracy by detecting the state of the selectively converted areas with respect to the rest of the film. Corrections can be made by converting the state of selected areas of the film as required.

A metal, such as nickel, is then electroplated onto the areas of the film which are in the high conductivity state. The plating is continued until the nickel spans the areas of the film on which it did not directly plate. In this way a continuous backing layer which is integral with the plated nickel is formed.

The nickel is then separated from the imaged material to provide a first stamping master which is used to form a second stamping master of opposite polarity to the first, preferably by a similar plating onto the first master. The second stamping master is used directly for video disk replication.

33 Claims, 9 Drawing Figures

APPARATUS FOR MAKING A STAMPING MASTER FOR VIDEO DISK REPLICATION

This is a division of application Ser. No. 383,176 filed May 28, 1982, now abandoned.

BACKGROUND OF THE INVENTION

This invention relates to an improved method and apparatus for making a stamping master to facilitate video disk replication.

The prior art methods currently in use generally rely on a photoresist technique. In this type of process, a photoresist coating sensitive to, for instance, laser or ultraviolet light is applied to a substrate. Selected areas of the coating, which correspond to the information to be encoded on the disk, are then subjected to the laser beam. The laser beam alters the areas of the coating upon which it impinges making those areas more soluble to developing solvents. Those areas of the photoresist coating which were subjected to the laser light are removed while the areas of the photoresist coating not impinged upon by the light remain unaffected. A thin conductive layer is then deposited over the developed photoresist and subjected to an electroplating bath. After plating to an appropriate thickness, the plated material and the conductive layer are separated from the substrate and photoresist and used as a stamping master.

The master is used as a die to form pits in a transparent plastic base material. Next a thin reflective layer of aluminum is deposited over the plastic base material and a protective coating is placed over the aluminum layer. Finally, two such assemblies are sandwiched together to form a double sided video disk.

In information retrieval, a light beam penetrates the transparent plastic base and is focused on the surface of the aluminum reflective layer. Light reflected from inside a pit will destructively interfere with light reflected from the spaces between the pits. Thus, intensity modulation of the reflected light beam is achieved as the video disk rotates and this intensity modulation is translated back into the stored information.

The prior art methods for the manufacture of a video disk are involved and costly processes. The primary disadvantage of these processes is that they provide no means by which the accuracy of the information etched onto the master may be verified until the conductive layer is formed on the partially completed master. Only then can the accuracy be verified. Obviously, any mistakes beyond a certain limit render the master worthless. Errors cannot be corrected. Moreover, a constant, costly supply of photoresist material and processing chemicals and facilities are required.

The method of the present invention on the other hand allows the coded information to be read and therefore verified for accuracy, and even corrected or erased, before the formation of the stamping master is even begun. This is achieved by using a material which is reversibly convertible between two stable states to initially receive the coded information. This information can be read for accuracy before forming the actual master.

One group of materials which exhibits variations in structure is amorphous semiconductors. Such materials are described and illustrated, for example, in U.S. Pat. No. 3,530,441 by Stanford R. Ovshinsky issued Sept. 22, 1970 and U.S. Pat. No. 3,678,852 by Julius Feinleib, et al., issued July 25, 1972. These amorphous semiconductor materials can be switched between two stable states in response to the application of light, electromagnetic energy or heat. In one state the material is substantially disordered, generally amorphous and has a high resistance or insulating condition. In the other state the atomic structure of the material is changed to a different local order as, for example toward a more ordered crystalline condition having a comparatively low resistance or conducting characteristic. For the purposes of this invention one of these states will be called hereinafter the crystalline or high conductivity state and the other will be called the amorphous or low conductivity state.

Energy is selectively applied to discrete portions of the semiconductor material causing an alteration in those discrete portions from the crystalline to the amorphous state or vice versa. The condition of those discrete portions can then be detected with respect to the surrounding areas to allow retrieval of the stored information in a non-destructive manner.

Furthermore, the method of the present invention obviates the need for the aforementioned conductive layer which is used in the prior art. This reduction in steps contributes a further savings of both time and expense as compared to the prior art.

SUMMARY OF THE INVENTION

The present invention provides a new and improved method, apparatus and intermediate subassemblies for making a stamping master to facilitate video disk replication wherein a thin film of material which is reversibly convertible between two stable states, one having a high electrical conductivity and the other having a low electrical conductivity, is deposited on a substrate while in one of the states.

The film is deposited on a substrate to a uniform thickness, preferably between 300 Å and 3000 Å, and then imaged with information in coded form by converting areas of the film to the other state in a predetermined pattern corresponding to the coded information. The conversion can be accomplished by focusing light, electromagnetic energy or heat on the film. For example, the film can be deposited on the substrate in an amorphous state and then converted in bulk to a crystalline state to achieve high electrical conductivity. Alternatively, the film could be deposited in a crystalline state. Selected areas of the film are then exposed to a focused laser beam in a predetermined pattern to effect a phase change in those areas of the film from a stable, crystalline, high conductivity state to a stable, amorphous, low conductivity state. The film material is selected to obtain a considerable difference between the electrical conductivities (eg. approximately four orders of magnitude is acceptable) of the two states. A preferred composition for the thin film is about 92% tellurium, 7% germanium and 1% oxygen.

At this stage, an intermediate subassembly composed of the imaged thin film on the substrate is produced which is extremely valuable in itself. The coded information can be read for accuracy by detecting the state of the selectively converted areas with respect to the rest of the film. This allows verification of the accuracy of the coded information before the stamping master is formed which was impossible with the prior art. Furthermore, corrections can be made by merely exposing selected areas of the film to the energy source as required.

An additional material is then deposited only onto the areas of the imaged film which are in one of the states and a continuous backing layer is formed over this deposited material. This is preferably accomplished by subjecting the imaged film to an electroplating bath containing, for instance, nickel. The nickel plates only onto the highly conductive cystalline areas of the film. The plating is continued until the nickel spans the areas of the film on which it did not directly plate. In this way, a continuous backing layer which is integral with the plated nickel is formed.

The nickel is then separated from the imaged material to provide a first stamping master. If the void areas of the first stamping master correspond to the coded information, the first stamping master is usable to form a second stamping master of opposite polarity to the first, preferably by a similar plating operation onto the first stamping master. The second stamping master is then used directly for video disk replication.

DESCRIPTION OF THE PREFERRED EMBODIMENT

Figure 1:
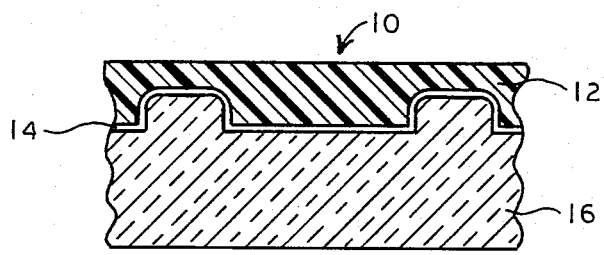
FIG. 1 is a partial, cross-sectional side view of one half of a finished video disk made by the method of the present invention.

Referring now more particularly to FIG. 1, there is shown a partial, cross-sectional side view of one half of a finished video disk 10. The disk 10 comprises a transparent plastic base material 12, a reflective aluminum layer 14 and a protective coating 16. The base material 12 is covered by the thin, reflective aluminum layer 14. The protective coating 16 is deposited over the aluminum layer 14. A finished disk has two such assemblies 10 sandwiched together.

Figure 2:
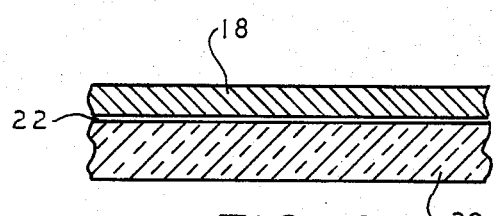
FIG. 2 is a partial, cross-sectional side view of a thin film of the convertible material in a crystalline state on a substrate.

Referring now to FIG. 2 there is shown a film of reversibly convertible material 18 deposited on a delaminating layer 22 which in turn has been deposited on a substrate 20. In one preferred embodiment, the thin film 18 of reversibly convertible material 18 is an amorphous semiconductor of the type described in U.S. Pat. No. 3,530,441 by Stanford R. Ovshinsky, issued Sept. 22, 1970 and U.S. Pat. No. 3,678,852 by Julius Feinlieb, et al., issued July 25, 1972. The film is deposited by vacuum deposition, or any similar method, in either a crystalline, high conductivity state, or an amorphous, low conductivity state. When deposited in an amorphous, low conductivity state, the film 18 in accordance with a preferred embodiment of the present invention, is converted in bulk to a crystalline, high conductivity state. This can be accomplished by exposing the film 18 to energy in the form of a light beam, electron beam, laser beam, heat, etc.

The thin film 18 can include tellurium, germanium, selenium, sulphur, oxygen and a metallic material. In accordance with one preferred embodiment of the present invention, the composition of the film 18 can be about 92% tellurium and 7% germanium in atomic percent and may have inclusions of about 1% oxygen and/or sulphur. Utilizing the above composition, the thin film 18, when deposited in an amorphous state is readily and effectively convertible in bulk to a crystalline state by heating the film 18 to 130° C. for five minutes and allowing it to cool at ambient temperatures. With this material deposited to a thickness of from about 300 Å to about 3000 Å, a desired difference in conductivity of about four orders of magnitude can be achieved between the crystalline and amorphous states.

Further compositions which can be utilized in practicing the present invention can consist of the memory material disclosed in U.S. Pat. No. 3,271,591 by Stanford R. Ovshinsky issued on Sept. 6, 1966 and described therein. When using these types of materials, desired resistances in the low and high conductivity states may be obtained by appropriate selection of composition and thickness.

The substrate 20 is preferably flat with a very good surface quality. This facilitates accurate and precise deposition of the film 18 to the desired thickness. For example, a glass substrate 20 polished to a surface flatness of one half wave/inch and with a surface quality having a scratch and dig rating of 40-20 would suffice. The delaminating layer 22 can be polyurethane which will separate easily from the glass substrate 20.

Figure 3:
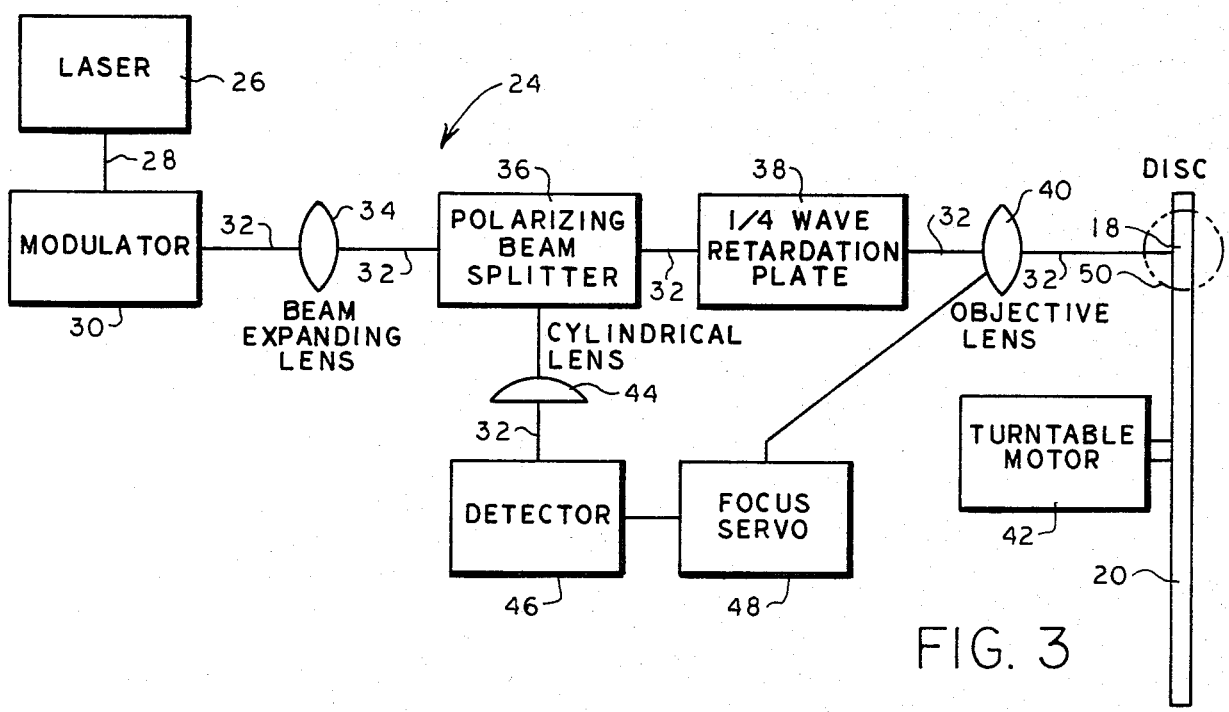
FIG. 3 is a schematic diagram of one embodiment for focusing a laser beam on the deposited crystalline film illustrated in FIG. 2.

FIG. 3 is a schematic representation of one preferred embodiment of a system 24 for focusing a laser beam on the thin film 18 in a predetermined pattern to convert selected areas of the film 18 from a crystalline to an amorphous state. The system 24 comprises a laser source 26, a modulator 30, a beam expanding lens 34 and a polarizing beam splitter 36. The system 24 further comprises a quarter wave retardation plate 38, an objective lens 40, a cylindrical lens 44, a detector 46 and a focus servo 48. Finally, a turntable motor 42 would be utilized to rotate the substrate 20 on which the film 18 is deposited.

The laser source 26 directs a vertically polarized beam 28 to the modulator 30 which interacts with the incoming beam 28. The now modulated beam 32 is directed through the beam expanding lens 34 which insures that substantially the entire aperture of the objective lens 40 is used.

The expanding lens 34 directs the pulsed beam 32 through the polarizing beam splitter 36, which at this stage exerts no influence on the modulated pulse 32 because of the vertical polarization, and onto the quarter wave retardation plate 38. The quarter wave retardation plate 38 imparts circular polarization to the modulated laser beam 32 and transmits the modulated beam 32 through the objective lens 40 and onto the thin film 18 at a selected discrete area 52 to convert the area 52 from one state to the other. The turntable motor 42, as noted above, rotates the substrate 20 to facilitate, together with the detector 46, focus servo 48 and objective lens 40, the conversion of areas of film 18 in the predetermined pattern.

The modulated laser beam 32 is reflected off the film 18, back through the objective lens 40 and to the quarter wave plate 38 where it now becomes horizontally polarized. The quarter wave plate 38 changes the polarization of the modulated beam 32 and transmits the same back to the beam splitter 36 where the modulated beam 32 is now deflected because of its horizontal polarization. The beam splitter 36 deflects the modulated laser beam 32 through the cylindrical lens 44 and onto the detector 46. The detector 46 furnishes information to the focus servo 48 which adjusts the focus of the objective lens 40 based upon the information collected by the detector 46.

Figure 4:
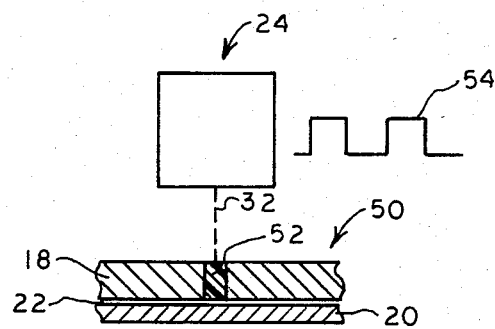
FIG. 4 is a schematic illustration showing a discrete portion of the crystalline material of FIG. 2 switched to an amorphous state by the system of FIG. 3.

FIG. 4 schematically represents a partial cross-sectional side view of a portion 50 of film 18 from FIG. 3 along with the laser system 24 described above. Also shown are sample waveforms 54 illustrating the amplitude and duration of the modulated laser beam 32.

As noted above, the film 18 can be deposited on the substrate 20 in an amorphous state and then, in one preferred embodiment, flashed or converted in bulk to a crystalline state before selected areas of the film are converted to the amorphous state in the predetermined pattern corresponding to the coded information. In another embodiment the film 18 can be deposited in the crystalline state.

FIG. 4 illustrates the next step in a preferred embodiment of the present invention wherein a selected discrete area 52 is switched to the amorphous state by the modulated beam 32 which is focused on the film 18 by the laser system 24 of FIG. 3.

In one preferred embodiment, the selected discrete areas 52 that are converted to the amorphous state are micro-sized. In this preferred embodiment, the individual discrete areas 52 are approximately 0.8 microns in diameter with approximately a 1.6 micron track pitch or space between annular tracks of selected areas 52 on the surface of the film 18. Such size and spacing will result, by the method to be hereinafter elaborated upon, in pits or depressions on the one-half finished video disk 10 of similar size and spacing. The length of each individual discrete area 52 as well as the spacing between discrete areas 52 that are within a given annular track will similarly control the length and spacing of the pits in the one-half disk 10. It is this length and spacing of the pits which determine the information of the finished video disk 10.

The modulated laser beam 32 operates to heat the discrete area 52 of the film 18 to at least a transition temperature and alter the discrete portion 52 to, for example, an amorphous, low conductivity condition. The duration of the pulse 54 is, for example, approximately 25 to 100 nanoseconds to produce the desired change in state.

Figure 5:
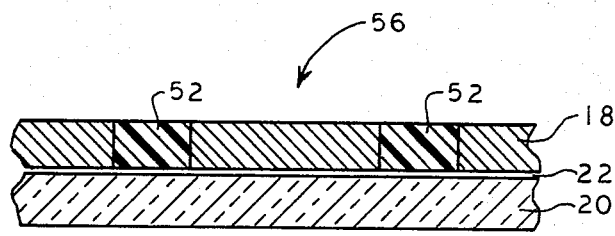
FIG. 5 is a partial, cross-sectional side view of the deposited film of FIG. 2 having discrete portions already switched from a crystalline state to an amorphous state.

Referring now more particularly to FIG. 5, there is illustrated the thin film 18, the substrate 20 and the delaminating layer 22 therebetween. The selected areas 52 of film 18 have been converted from one state to the other by the modulated laser beam 32 using the laser system 24 as illustrated in FIG. 4. in a predetermined pattern. The film 18 is now in a condition to serve as a template for the actual formation of the first stamping master.

At the stage represented by FIG. 5, an intermediate subassembly 56 in the present method is formed which has great value in itself. For example, at this stage, selected areas 52 of the crystalline thin film 18 have been converted in a predetermined pattern corresponding to the information to be reproduced, to an amorphous state. The single greatest value of this subassembly lies in the fact that the coded information now imaged in the thin film 18 can be read by detecting the state of the selectively converted discrete portions 52 with respect to the rest of the film 18. This capability makes possible verification of the accuracy of the imaged information at an earlier and therefore less costly stage of the manufacturing process than previously possible. Furthermore, when an error in the imaged information is discovered, the reversible nature of the thin film 18 allows corrections or even complete reimaging by merely exposing selected areas 52 of the film 18 as required.

Figure 6:
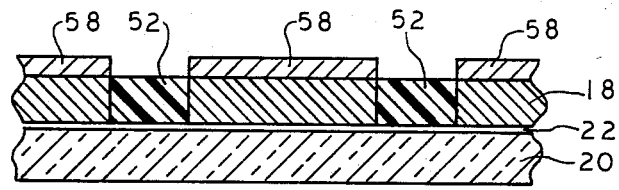
FIG. 6 illustrates a first stage of electoplating onto the crystalline portions of the view of FIG. 5.

Referring now more particularly to FIG. 6, an early stage of the deposition of an additional material 58 on the imaged film 18 is illustrated. In accordance with a preferred embodiment, the deposition is accomplished by subjecting the intermediate subassembly 56 described with respect to FIG. 5 to an electroplating bath containing nickel. In such a process, the nickel 58 will plate only onto the crystalline areas of the film 18 because of the high conductivity of these areas. The low conductivity of the selected areas 52, which were converted by the laser system 24 to an amorphous state, precludes the nickel 58 from being placed onto those selected areas 52.

Figure 7:
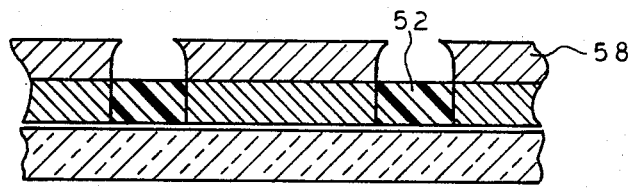
FIG. 7 illustrates an intermediate stage of the view of FIG. 6 where a continuous backing layer is beginning to be formed.
Figure 8:
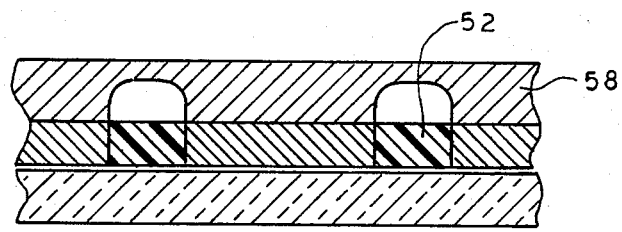
FIG. 8 is the sectional view of FIG. 7 where the plated material has formed the continuous backing layer.

The next step in the method of the present invention involves forming a continuous backing layer over the deposited nickel 58. The continuous backing layer is preferably formed by continuing the deposition of the nickel 58 as illustrated in FIGS. 7 and 8. FIG. 7 illustrates an intermediate stage in this preferred process for forming the continuous backing layer wherein the nickel 58, as its deposition continues, has begun to bridge over the discrete amorphous portions 52 of the film 18 on which the nickel 58 has not been directly deposited. FIG. 8 shows the completed continuous backing layer which has been formed by the continued deposition of the nickel 58. The formation of the continuous backing layer can also be accomplished by providing a separate backing layer such as a glass or metal plate.

Figure 9:
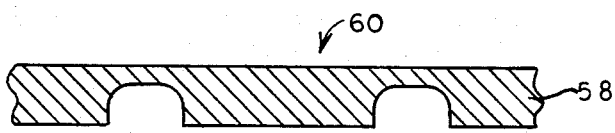
FIG. 9 illustrates a first stamping master delaminated from the convertible material and a second stamping master formed from, and of reversed polarity to, the first stamping master.
Figure 9:
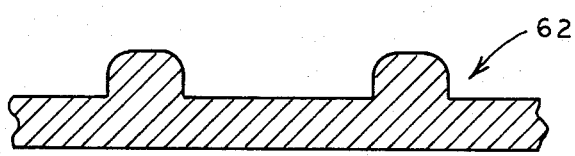

Referring now more particularly to FIG. 9, a partial cross-sectional side view of the preferred embodiment of the nickel 58 with its integral backing layer as illustrated in FIG. 8 is shown after delamination from the thin film 18. This structure, the deposited nickel 58 with its integral backing layer, can be used as a first stamping master 60 having a first polarity. FIG. 9 also illustrates a partial cross-sectional side view of a second stamping master 62 having a second polarity opposite that of the first master 60.

The first stamping master 60 can be used directly for video disk replication. If this is done, the one half finished video disk 10 formed from the first master 60 would have raised areas which, in combination with the surface surrounding these raised areas, would cause the intensity modulation of the reflected light beam as discussed above.

Alternatively, to arrive at what might be a more commercially acceptable form of the finished disk, the second master 62 is formed by a process similar to that described above regarding the formation of the first stamping master 60. A material is deposited onto the first stamping master 60. In accordance with one preferred embodiment, this material could again be nickel. A continuous support layer is formed, again preferably by continuing the plating of the nickel, to provide a second stamping master 62. The second master 62 is delaminated from the first stamping master 60 and used directly for disk replication.

As can be appreciated from the foregoing, the present invention provides a new and improved method, apparatus and intermediate subassemblies for making a stamping master for video disk replication. The method does away with the risks of wasted time, manpower and materials involved in not being able to verify the accuracy of the coded information until completion of the entire process. Furthermore, the present invention includes less steps and is therefore less expensive and less time consuming than those techniques currently in use.

For each embodiment of the invention described herein, the thin film 18 can be other than an amorphous material, such as a polycrystalline material. (By the term "amorphous" is meant an alloy or material which has long range disorder, although it may have short or intermediate order or even contain at times some crystalline inclusions.)

Modifications and variations of the present invention are possible in light of the above teachings. It is therefore to be understood that within the scope of the appended claims the invention may be practiced otherwise than as specifically described.

What is claimed and described to be secured by letters patent of the United States is:

1. An apparatus for making a stamping master to facilitate video disk replication comprising:
   (a) thin film deposition means for depositing a thin film of material over a substrate, said material being reversibly convertible at least twice between a first state and a second state, said means depositing said film in one of said states;
   (b) converting means for converting selected areas of said film from one of said states to the other said state in a predetermined pattern;
   (c) means for depositing at least one additional material onto at least a portion of the areas of said film corresponding to one of said states;
   (d) means for forming a continuous backing layer over at least part of said additional material; and
   (e) means for separating said backing layer and said additional material from said film, said backing layer and said additional material forming a first stamping master.

2. The apparatus as defined in claim 1 wherein said first state of said film is a state of high electrical conductivity.

3. The apparatus as defined in claim 2 wherein said second state of said film is a state of low electrical conductivity.

4. The apparatus as defined in claim 3, wherein said thin film deposition means include means for depositing said film in said high electrical conductivity state.

5. The apparatus as defined in claim 4 wherein said means for converting selected areas of said film from one of said states to the other said state are adapted to convert said selected areas from said high electrical conductivity state to a low electrical conductivity state.

6. The apparatus as defined in claim 5 wherein said means for depositing said additional material are adapted to deposit said additional material only onto at least a portion of said areas of high conductivity.

7. The apparatus as defined in claim 3 wherein said thin film deposition means include means for depositing said thin film in said low electrical conductivity state.

8. The apparatus as defined in claim 7 wherein said thin film deposition means include means for depositing said thin film in an amorphous state.

9. The apparatus as defined in claim 8 further comprising means for converting said deposited amorphous film in bulk to a crystalline state.

10. The apparatus as defined in claim 9 wherein said means for converting said selected areas of said film from said first state to said second state include means for converting said selected areas from said crystalline state to said amorphous state.

11. The apparatus as defined in claim 10 wherein said means for deposition of said additional material are adapted to deposit said additional material only onto at least a portion of said areas in said crystalline state.

12. The apparatus as defined in claim 7 further comprising means for converting said deposited low electrical conductivity film in bulk to a high electrical conductivity state.

13. The apparatus as defined in claim 12 wherein said means for converting said selected areas of said film from said first state to said second state include means for converting said selected areas from said high conductivity state to said low conductivity state.

14. The apparatus as defined in claim 13, wherein said means for deposition of said additional material are adapted to deposit said additional material only onto at least a portion of said areas of high conductivity.

15. The apparatus as defined in claim 3 wherein said high conductivity state of said thin film is approximately four orders of magnitude greater than said low conductivity state.

16. The apparatus as defined in claim 1 wherein said thin film deposition means are adapted to deposit said film to a thickness of from about 300 Å to about 3000 Å.

17. The apparatus as defined in claim 1 wherein said means for converting selected areas of said film from one of said states to the other said state further comprises means for applying electromagnetic energy to said film in said predetermined pattern.

18. The apparatus as defined in claim 1 wherein said means for converting said selected areas of said film from said first state to said second state include means for converting micro-sized areas to said second state.

19. The apparatus as defined in claim 1 wherein said means for depositing said additional material include means for electroplating.

20. The apparatus as defined in claim 1 wherein said backing layer forming means are adapted to continue the deposition of said additional material until said deposited additional material forms said continuous layer over those areas of said film on which said additional material is not deposited.

21. The apparatus as defined in claim 1 further comprising means for forming a reversed duplicate from said first stamping master to provide a second stamping master of opposite polarity.

22. The apparatus as defined in claim 21 wherein said means for forming said duplicate of opposite polarity further comprise:
 (a) means for depositing further material onto said additional material of said first stamping master;
 (b) means for forming a continuous support layer over at least part of said further material; and
 (c) means for separating said further material and said continuous support layer from said first stamping master to form said reversed duplicate to provide said second stamping master of opposite polarity.

23. The apparatus as defined in claim 22 wherein said further material includes a metallic material.

24. The apparatus as defined in claim 23 wherein said metallic material includes nickel.

25. The apparatus as defined in claim 22 wherein said means for depositing said further material onto said additional material of said first stamping master are adapted to deposit said further material only onto at least a portion of said additional material of said first stamping master.

26. The apparatus as defined in claim 25 wherein said means for depositing said further material are adapted to deposit said further material only onto that portion of said additional material of said first stamping master which corresponds to said selected areas of said thin film in one of said states.

27. The apparatus as defined in claim 22 wherein said means for forming said continuous support layer are adapted to continue the deposition of said further material until said deposited further material forms said continuous support layer over those areas of said first stamping master which correspond to those areas on said thin film on which said additional material was not deposited.

28. The apparatus as defined in claim 1 wherein said additional material includes a metallic material.

29. The apparatus as defined in claim 28 wherein said metallic material includes nickel.

30. The apparatus as defined in claim 1 wherein said substrate further comprises glass.

31. The apparatus as defined in claim 1 wherein said glass substrate includes a surface having a flatness of approximately one-half wave per inch.

32. The apparatus as defined in claim 1 further comprising means for depositing a delaminating layer on said substrate.

33. The apparatus as defined in claim 32 wherein said delaminating layer includes polyurethane.

* * * * *

UNITED STATES PATENT AND TRADEMARK OFFICE
CERTIFICATE OF CORRECTION

PATENT NO. : 4,537,670
DATED : August 27, 1985
INVENTOR(S) : David A. Strand

It is certified that error appears in the above-identified patent and that said Letters Patent is hereby corrected as shown below:

Column 5, line 53, delete "of" and insert -- on --;
Column 6, line 34, delete "placed" and insert -- plated --;

Signed and Sealed this

Twenty-fourth Day of December 1985

[SEAL]

Attest:

DONALD J. QUIGG

Attesting Officer

Commissioner of Patents and Trademarks